United States Patent

[11] 3,585,529

[72] Inventor Sidney Darlington
Passaic Township, Morris County, N.J.

[21] Appl. No. 776,395
[22] Filed Nov. 18, 1968
[45] Patented June 15, 1971
[73] Assignee Bell Telephone Laboratories, Incorporated
Murray Hill, Berkeley Heights, N.J.

[54] SINGLE-SIDEBAND MODULATOR
7 Claims, 16 Drawing Figs.

[52] U.S. Cl. .......... 332/45, 332/48
[51] Int. Cl. .......... H03c 1/52
[50] Field of Search .......... 325/50, 137; 332/41, 45, 48; 333/70 A, 70

[56] References Cited

UNITED STATES PATENTS

| | | | |
|---|---|---|---|
| 2,909,656 | 10/1959 | Meyer .......... | 333/70 X |
| 2,935,701 | 3/1960 | Robinson et al. .......... | 332/45 |
| 3,081,434 | 3/1963 | Sandberg .......... | 333/70 X |

OTHER REFERENCES

Linvill " Use Of Sampled Functions For Time Domain Synthesis" PROCEEDINGS, NATIONAL ELECTRICAL CONFERENCE CHICAGO 1953 TK7801N3, pp. 533— 542
FREQUENZ pp. 397— 406 Vol. 20 1966, Number 12

*Primary Examiner*—Roy Lake
*Assistant Examiner*—Lawrence J. Dahl
*Attorneys*—R. J. Guenther and William L. Keefauver

ABSTRACT: A single-sideband modulator is realized by supplying an input signal to be modulated to a plurality of circuit paths. At least one of said circuit paths comprises the serial connection of a first modulator, a noninductive filter network, and a second modulator. The output signals of each circuit path are arithmetically combined to develop a single-sideband modulated counterpart of the input signal.

INVENTOR
S. DARLINGTON
BY Gerard E. Murphy
ATTORNEY

FIG. 10
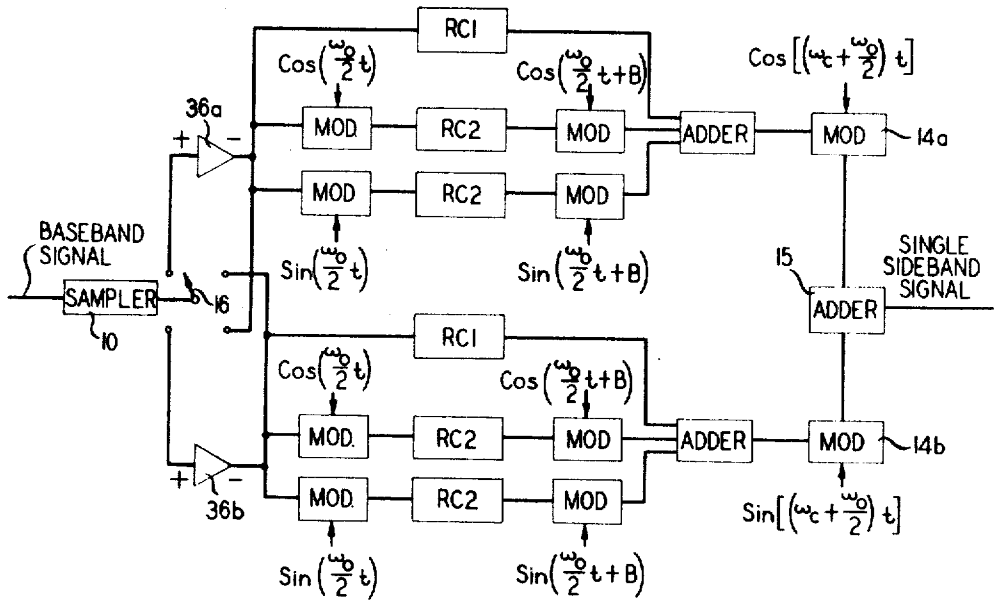
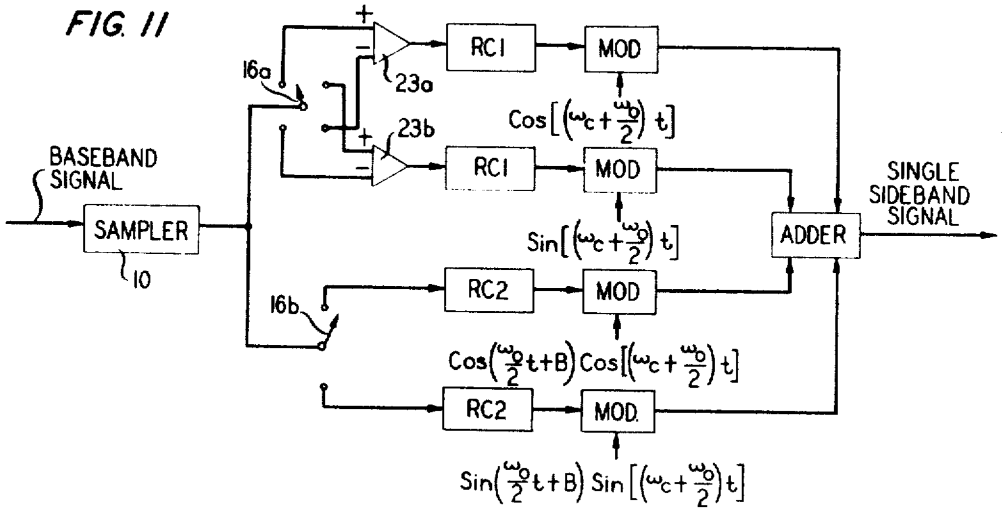
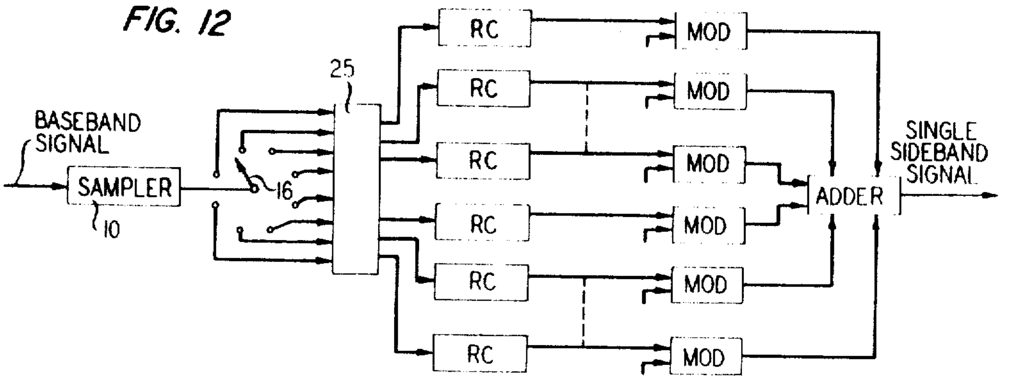

SINGLE-SIDEBAND MODULATOR

BACKGROUND OF THE INVENTION

1. Field of the Invention

This invention pertains to apparatus for generating a modulated counterpart of an applied signal and, more particularly, to single-sideband modulation apparatus.

Fundamental to the communication of information is efficiency of transmission, whether measured in terms of bandwidth, power required, complexity of the circuitry or other applicable criteria. Efficiency of transmission necessitates that the information to be communicated to a distant point be processed before transmission over an intervening medium. In terms of modern communications, signal processing comprises modulation, in one form or another, of an information-bearing signal. Modulation not only makes transmission possible at frequencies higher than the frequencies of the information-bearing components of the applied signal, but also permits frequency multiplexing, i.e., staggering of frequency components over a specified frequency spectrum.

It is well known that the process known as amplitude modulation is wasteful of signal spectrum, since transmitting both sidebands of a modulated signal requires double the bandwidth needed for only one sideband, and is wasteful of power, particularly since the transmitted carrier conveys no information. Thus, as the useful frequency spectrum has become congested, resort has been made to a form of modulation, i.e., single-sideband, where only one sideband, as the name implies, is transmitted. Of course, to maximize efficiency of transmission, the manner in which the single-sideband modulated signal is generated must be made as efficient and economical as is technologically possible. Particularly is this true in those large frequency multiplex systems where thousands, if not tens of thousands, of single-sideband modulations are utilized.

2. Description of the Prior Art

Conventional single-sideband modulators, as will be discussed in more detail hereinafter, rely upon the use of either low-pass or band-pass filters to properly exclude undesirable signals. In classical communication engineering, highly frequency selective circuits, such as the filters referred to, are constructed from the basic building blocks of resistors, capacitors and inductors. While it is feasible and advantageous to develop resistors and capacitors in microminiaturized thin film or solid state form, the same is not true for inductors or their equivalents. Inductive elements are not only expensive, but are also bulky items relative to the size of microminiaturized components. Thus, systems engineers have been stymied in their search to economize and make more efficient the process of single-sideband modulation, since inductors do not lend themselves to realization by the new circuit technologies.

It is therefore an object of this invention to overcome this barrier to efficient and economical communication.

SUMMARY OF THE INVENTION

In accordance with the principles of this invention, this object and other objects are accomplished by synthesizing, with noninductive devices, the filters required in a single-sideband modulator. More particularly, the low-pass or band-pass filters of a single-sideband modulator are supplanted by a plurality of circuit branches each comprising multiplying means and noninductive filter means, e.g., a resistance-capacitance (RC) filter. Fortuitously, the interactive result of the circuit branches and the components of the single-sideband modulator is a greatly simplified single-sideband modulator, which may be realized by the new solid state and thin film circuit technologies. Furthermore, the principles of this invention may be implemented using either passive RC filters or active RC filters. Indeed, by the practice of this invention, the complexity and sensitivity to component variations of active RC filters is greatly reduced. In addition, this invention provides stimulus for the design of a vast number of alternative embodiments of a single-sideband modulator incorporating the principles discussed herein.

BRIEF DESCRIPTION OF THE DRAWINGS

FIGS. 10 and 11 illustrate alternative embodiments of the single-sideband modulators depicted in FIGS. 8 and 9;

FIG. 12 illustrates a generalized single-sideband modulator in accordance with this invention;

DETAILED DESCRIPTION OF THE INVENTION

Figure 1:
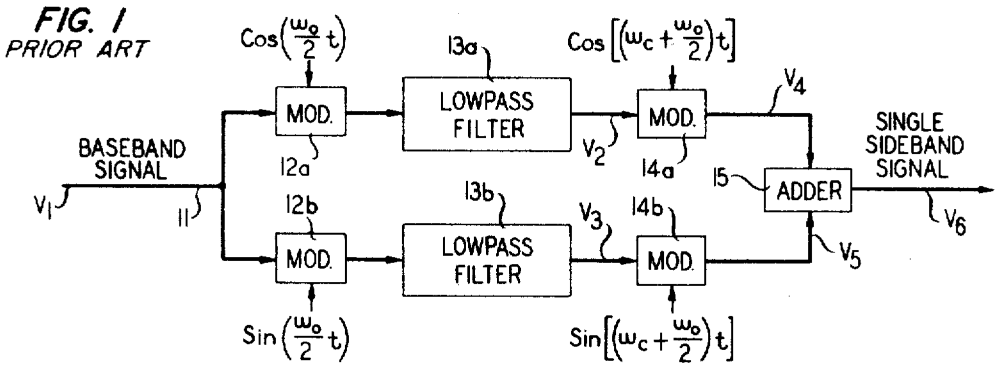
FIG. 1 PRIOR ART
FIGS. 1 and 2 are block diagrams of prior art single-sideband modulators.

FIG. 1 illustrates a prior art single-sideband modulator of the type (hereinafter referred to as a Weaver modulator) disclosed in the *Proceedings of the IRE*, at page 1703, Dec. 1956; of course, any one of the conventional modulators of the prior art may have been used for exemplary purposes. A baseband signal, having a maximum frequency component less than a predetermined frequency, $f_o$, is applied via line 11 to two parallel circuit branches, each comprising the serial connection of a modulator 12*a*, 12*b*, low-pass filter 13*a*, 13*b*, and a second modulator 14*a*, 14*b*. The signals emanating from modulators 14*a* and 14*b* are arithmetically combined by adder network 15 to develop a single-sideband modulated counterpart of the applied input signal.

Modulating signal sources for the various modulators, e.g., 12*a*, have not been shown in FIG. 1 or the other figures of the drawings of this disclosure in order to avoid undue complexity; instead, an arrow terminating at a modulator with a legend such as $\cos((W_o/2)t)$ represents an applied waveform from an auxiliary signal source of any well-known construction.

Assuming upper sideband modulation, representative signal components $V_1$, $V_2$, etc., identified in FIG. 1, may be mathematically expressed as:

$$V_1=\cos(wt+\beta)$$
$$V_2=\cos\left[\left(\frac{w_0}{2}-w\right)t-\beta\right]$$
$$V_3=\sin\left[\left(\frac{w_0}{2}-w\right)t-\beta\right]$$
$$V_4=\cos\left[\left(\frac{w_0}{2}-w\right)t-\beta\right]\cos\left[\left(w_c+\frac{w_0}{2}\right)t\right]$$
$$V_5=\sin\left[\left(\frac{w_0}{2}-w\right)t-\beta\right]\sin\left[\left(w_c+\frac{w_0}{2}\right)t\right]$$
$$V_6=\cos[(w_c+w)t+\beta], \qquad (1)$$

where $w=2\pi f$, $w_o=2\pi f_o$ and $w_c$ is a predetermined carrier frequency. A demodulator is obtained by interchanging the modulating signal inputs to each modulator in each respective circuit branch. Stated another way, the input becomes the output, and vice versa, and adder network 15 is positioned at the junction of line 11 and both circuit branches. As is well known, such interchangeability is a common attribute of most modulators. Accordingly, whenever a modulator circuit is described herein, it is to be understood that the same principles of operation are applicable to a demodulator circuit.

Figure 2:
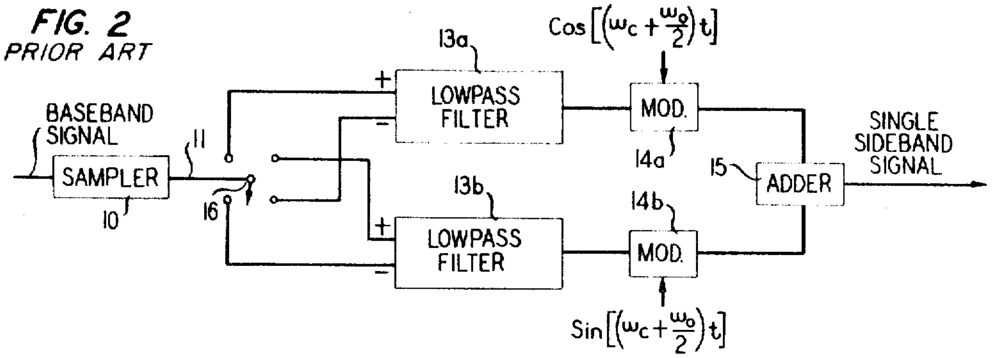
FIG. 2 PRIOR ART

FIG. 2 depicts a prior art variation of the single-sideband modulator-demodulator of FIG. 1 wherein modulators 12*a* and 12*b* have been replaced by a commutator device 16, of any well-known type, and the applied baseband signal has been sampled prior to application to device 16. Since commutator device 16 performs essentially a switching function, it multiplies the input signal by a series of harmonically related sinusoidal signals having a predetermined fundamental frequency, e.g., $w_o/2$, related to the angular frequency of device 16. There is, therefore, generated at the output terminals of device 16 a multiplicity of sum and difference frequencies centered about harmonics of a fundamental frequency in a manner equivalent to conventional modulators such as 12*a* and 12*b* of FIG. 1. The negative terminals of low-pass filters 13*a* and 13*b* signify that the signals appearing at these terminals must be inverted in order to maintain the desired phase relationship among the various samples of the applied signal.

In large multiplex transmission systems, the use of conventional low-pass or band-pass filters, such as found in Weaver or conventional single-sideband modulators, greatly increases the cost of such systems since inductive elements, which form a part of such filters, may not be realized by thin film and solid state circuitry. On the other hand, the use of passive RC filters, i.e., containing only resistors and capacitors and no inductive devices, yields frequency transfer functions with only real poles, $s=a \pm i(o)$, i.e., poles on the real axis. Complex poles, poles with nonzero imaginary parts, may be obtained by using active components such as transistors but, active RC circuits with complex poles tend to be relatively complicated and sensitive to component variations. Unfortunately, where high quality distortion and crosstalk standards must be met, realization of low-pass filters as time-invariant circuits requires either complex poles with large ratios of imaginary to real parts, or else, an extremely large number of real poles. Thus, conventional modulators such as shown in FIGS. 1 and 2 do not lend themselves to economic realization by the new circuit technologies.

Figure 3:
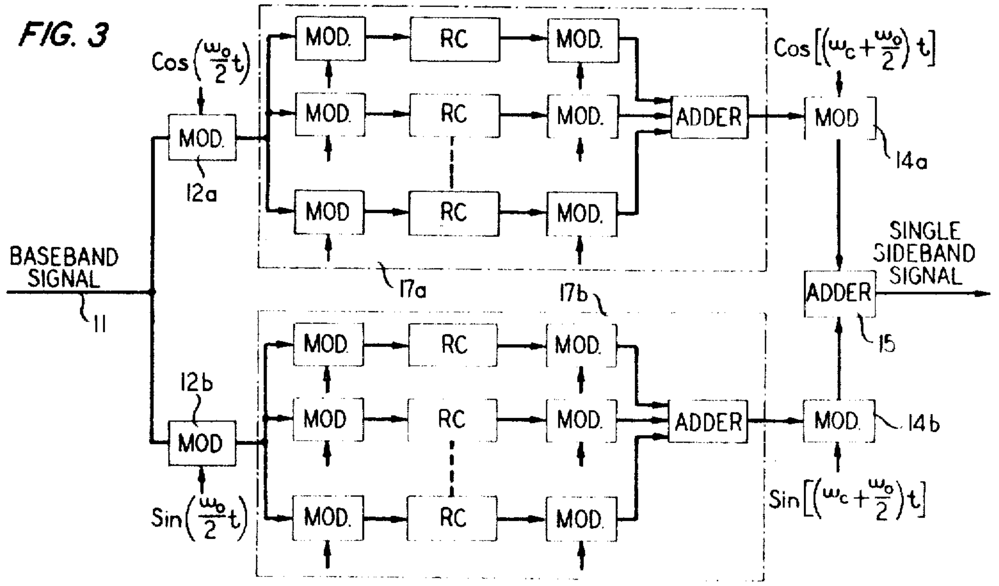
FIG. 3 is a block diagram of a single-sideband modulator in accordance with this invention.

In accordance with the principles of this invention, an economical single-sideband modulator may be realized without relying on the use of inductive filter elements, while still complying with high quality specifications of permitted distortion and crosstalk. FIG. 3 depicts such a modulator. It is noted that there is a direct correspondence between FIG. 1 and FIG. 3 with the exception of the components embraced by the blocks identified as 17*a* and 17*b*, which replace low-pass filters 13*a* and 13*b*.

In order to understand the operation of the modulator of FIG. 3, suppose a time-invariant filter network has an impulse response of the form $h(t)=h_\theta(t)\cos(w_\theta t+\beta_\theta)$, (2) which implicitly requires complex poles ($h_\theta(t)$ is assumed to have only real poles). The response, $V_\theta(t)$, of a network characterized by equation (2) to an applied signal, E($t$), may be expressed as $$V_\theta(t)=\left[\int_{-\infty}^{+\infty}E(\tau)\cos(w_\theta\tau+\gamma)h_\theta(t-\tau)d\tau\right]\cos(w_\theta t+\gamma+\beta)+\left[\int_{-\infty}^{+\infty}E(\tau)\sin(w_\theta\tau+\gamma)h_\theta(t-\tau)d\tau\right]\sin(w_\theta t+\gamma+\beta) \quad (3)$$

where $\gamma$ is an arbitrary phase angle.

Figure 4:
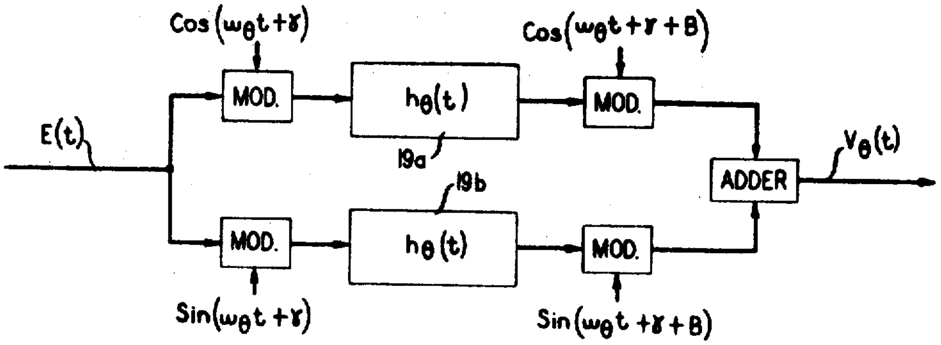
FIGS. 4 and 5 illustrate the synthesis of a noninductive low-pass filter.

FIG. 4 depicts an embodiment of a circuit in accordance with equation (3). It is noted that RC networks 19*a* and 19*b* are only required to have real poles since they are simply passive network realizations having an impulse response $h_\theta(t)$. The sinusoidal terms of equation (3) are supplied by the depicted modulating functions.

The filter shown in FIG. 4 is a special case of an N-Path filter described by Franks and Sandberg in the article entitled "An Alternative Approach to the Realization of Network Transfer Functions: The N-Path Filter," *The Bell System Technical Journal*, Sept. 1960, page 1321. As discussed by Franks and Sandberg, if a filter is desired having the response $h(t)=h_\theta(t)r(t)$ $$r(t)=\sum_{m=-M}^{m=+M} r_m e^{imw_\theta t},\ r_{-m}=r_m^*, \quad (4)$$

and if we define two functions, $p(t)$ and $q(t)$ which are related to $r(t)$ by $$p(t)=\sum_{m=-M}^{m=+M} p_m e^{iw_\theta mt}$$

$$q(t)=\sum_{m=-M}^{m=+M} q_m e^{iw_\theta mt}$$

$$p_{-m}=p_m^*,\ q_{-m}=q_m^*,\ q_m^*q_m=r_m, \quad (5)$$

in place of equation (3), we have in general $$V_\theta(t)=\sum_{n=0}^{N-1}\left\{\left[\int_{-\infty}^{+\infty}E(\tau)p\left(\tau-\frac{2\pi n}{Nw_\theta}\right)h_\theta(t-\tau)d\tau\right]q\left(t-\frac{2\pi n}{Nw_\theta}\right)\right\} \quad (6)$$

Figure 5:
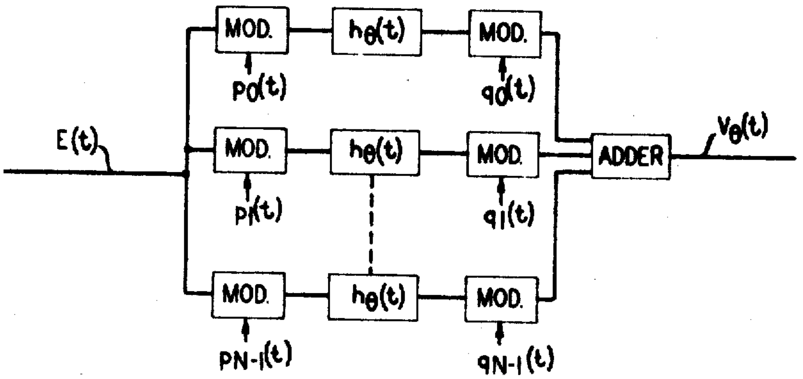

An N-Path filter network corresponding to equation (6) is shown in FIG. 5. Each branch of the network of FIG. 5 includes modulator apparatus for multiplying the applied signal, $E(t)$, by a locally generated periodically varying function of time, $p(t)$. After transmission through a network having only real poles, the signal is again multiplied by a locally generated periodically varying function of time, $q(t)$, which is related to the first multiplication factor. The multiplication by periodically varying factors may be equivalently performed by commutation, i.e., cyclical switching of the input signal from path to path and cyclical switching of the output signals of the various paths to the output terminal of the system. See, e.g., the above-cited Franks-sandberg article. One may consider the commutator to be using multiplication factors which are "0" when the switches are open and "1" when they are closed. Of course, the switching or commutation may be accomplished mechanically or with any of the many other electronic equivalents which are well known in the art.

Two or more N-Path filter networks, each using different RC circuits and multiplication factors, may be connected in parallel or cascade arrangement to realize almost any desired filter response. The response for such a combination is then the sum or product of the frequency functions describing the separate N-Path filter embodiments. For example, a classical LC network response may be obtained by realizing each pair of conjugate complex poles of the LC network by means of a simple two path circuit of the type, for example, shown in FIG. 4.

Returning to FIG. 3, we may now recognize that blocks 17*a* and 17*b* comprise two separate N-Path filter networks which supplant the two low-pass filters 13*a* and 13*b* of FIG. 1.

In accordance with the principles of this invention, the modulators of FIG. 3 may be combined in such a way that the input signal is modified by only one product modulator, between the system input and each input port of and RC circuit, and between each output port of an RC circuit and the system output. For example, in a typical embodiment of an N-Path filter, which may be used in blocks 17a and 17b of FIG. 3, sinusoidal factors in quadrature related pairs, cos ($w_\theta t30\ \gamma_\theta$) and sin ($w_\theta t{+}\gamma$ ), are used for the modulating functions $p(t)$ and $q(t)$ of equation (6). The phase angle, $\gamma$, is generally arbitrary. The modulators in each branch of the N-Path filter may be combined with the input modulators 12a and 12b of FIG. 3 in the following fashion:

$$\cos\left(\frac{w_0}{2}t\right)\cos(w_\theta t+\gamma_\theta)=P1a=A_1+A_2$$

$$=\frac{1}{2}\left\{\cos\left[\left(\frac{w_0}{2}-w_\theta\right)t-\gamma_\theta\right]+\cos\left[\left(\frac{w_0}{2}+w_\theta\right)t+\gamma_\theta\right]\right\}$$

$$\cos\left(\frac{w_0}{2}t\right)\sin(w_\theta t+\gamma_\theta)=P2a=-B_1+B_2$$

$$=-\frac{1}{2}\left\{\sin\left[\left(\frac{w_0}{2}-w_\theta\right)t-\gamma_\theta\right]+\sin\left[\left(\frac{w_0}{2}+w_\theta\right)t+\gamma_\theta\right]\right\}$$

$$\sin\left(\frac{w_0}{2}t\right)\cos(w_\theta t+\gamma_\theta)=P1b=B_1+B_2$$

$$=\frac{1}{2}\left\{\sin\left[\left(\frac{w_0}{2}-w_\theta\right)t-\gamma_\theta\right]+\sin\left[\left(\frac{w_0}{2}+w_\theta\right)t+\gamma_\theta\right]\right\}$$

$$\sin\left(\frac{w_0}{2}t\right)\sin(w_\theta t+\gamma_\theta)=P2b=A_1-A_2$$

$$=\frac{1}{2}\left\{\cos\left[\left(\frac{w_0}{2}-w_\theta\right)t-\gamma_\theta\right]-\cos\left[\left(\frac{w_0}{2}+w_\theta\right)t+\gamma_\theta\right]\right\} \quad (7)$$

Of course, similar products, P1$a'$, P2$a'$, etc., may be obtained by combining the modulators on the output side of the RC networks of FIG. 3. Furthermore, the illustrated combinatorial scheme is not limited to the instant example but, rather, finds general application.

Figure 6:
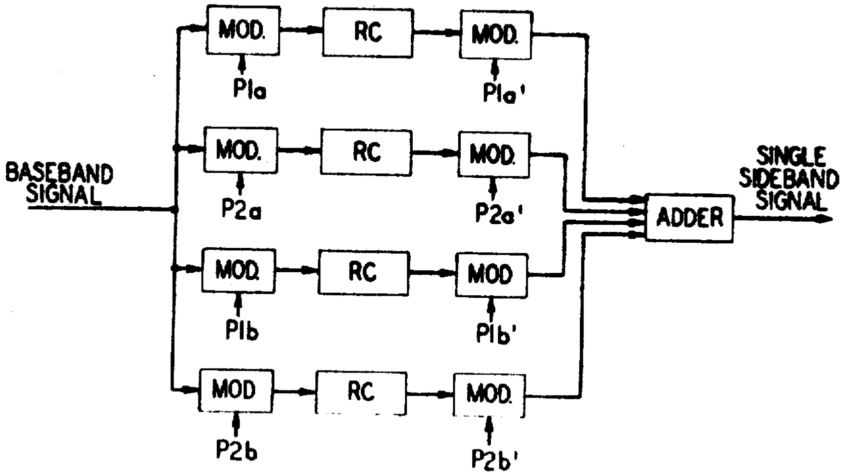
FIGS. 6 and 7 are block diagrams of single-sideband modulators which incorporate the combinatorial principles of this invention.

FIG. 6 illustrates the resulting single-sideband modulator which incorporates the combinatorial scheme of equation (7). It is to be noted that each branch of the modulator of FIG. 6 includes only tow modulators and an RC network with real poles. Since modulators and networks of the type described can be realized by the new circuit technologies, a great saving in expense is achieved by the instant invention. Signals, P1$a$, P2$a$, etc., applied to the individual branch modulators of FIG. 6, of course, correspond to sinusoidal functions of the sum and difference of the original frequencies, as dictated by equation (7).

Figure 7:
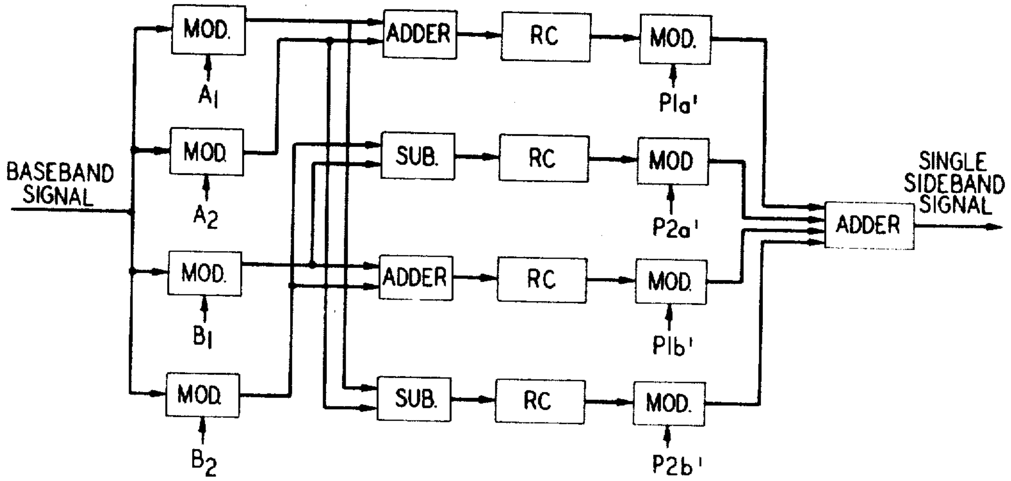

It is noted that the four products of equation (7) decompose into sums and differences of only four different sinusoids, i.e., $A_1$, $A_2$, $B_1$ and $B_1$. Thus, in an alternative embodiment, the four sinusoidal factors of equation (7) may each be applied via modulators to the input signal and then each of the four modified signals emanating from the modulators may be connected to the RC networks, after appropriate addition or subtraction, as illustrated by FIG. 7.

At this juncture it may be enlightening to consider the synthesis of a single-sideband modulator where the impulse response A($t$) of each low-pass filter has the form $A(t)=A_1(t)+A_2(t)$ $$A_1(t)=\sum_{\theta=1}^{N_1}K_\theta e^{-a_\theta t}$$

$$A_2(t)=\sum_{\lambda=1}^{N_2}K_\lambda e^{-a_\lambda t}\cos\left(2\pi\frac{f_0}{2}t+\beta\right) \quad (8)$$

in which all parameters are real, $f_0=w_0/2\pi$, and $\beta$ is the same for all the terms in the sum defining $A_2(t)$. In equivalent frequency domain terms the voltage transfer function has the form $Y(iw)=AY_1(iw)+Y_2(iw)$ $$Y_1(iw)=\sum_{\theta=1}^{K_1}\frac{K_\theta}{iw+a_\theta}$$

$$Y_2(iw)=\frac{1}{2}\sum_{\lambda=1}^{N_2}\left[\frac{K_\lambda e^{-i\beta}}{iw+a_\lambda+i\frac{w_0}{2}}+\frac{K_\lambda e^{i\beta}}{iw+a_\lambda-i\frac{w_0}{2}}\right] \quad (9)$$

in which $w=2\pi f$ and $w_0=2\pi f_0$.

Each filter may be realized as an N-path filter embodiment comprising two parallel connected subcircuits defined, respectively, by $A_1(t)$ and $A_2(t)$. The first subcircuit has only real poles in the frequency domain and thus may be synthesized solely by an RC network. The second subcircuit is realized by an N-Path filter with multiplication factors of cos $2\pi f_0/2t$ and sin $2\pi f_0/2t$.

In general, as per equation (7), the frequency of these factors corresponds to $w_\theta$, the damped radian frequency, i.e., the imaginary part of the poles of the filter transfer function. FIG. 3 then simplifies to the circuitry depicted in FIG. 8. The poles of networks RC1 correspond to the poles of the filter function $A_1(t$ while the poles of networks RC2 correspond to the real part of the poles of the filter function $A_2(t)$. Utilizing the combinatorial scheme of this invention, equation (7) specializes, for this case, to $$\cos\left(2\pi\frac{f_0}{2}t\right)\cos\left(2\pi\frac{f_0}{2}t\right)=\frac{1}{2}[1+\cos 2\pi f_0t]$$

$$\cos\left(2\pi\frac{f_0}{2}t\right)\sin\left(2\pi\frac{f_0}{2}t\right)=\frac{1}{2}[0+\sin(2\pi f_0t)]$$

$$\sin\left(2\pi\frac{f_0}{2}t\right)\text{eos}\left(2\pi\frac{f_0}{2}t\right)=\frac{1}{2}[0+\sin(2\pi f_0t)]$$

$$\sin\left(2\pi\frac{f_0}{2}t\right)\sin\left(2\pi\frac{f_0}{2}t\right)=\frac{1}{2}[1-\cos 2\pi f_0t] \quad (10)$$

Applying the results of equation (10) and utilizing linear transformation techniques, which will be discussed hereinafter, the circuit of FIG. 8 simplifies to the circuit depicted in FIG. 9. The single-sideband modulator of FIG. 9 therefore represents a simplified and extremely economical embodiment of the desired modulator.

Figure 8:
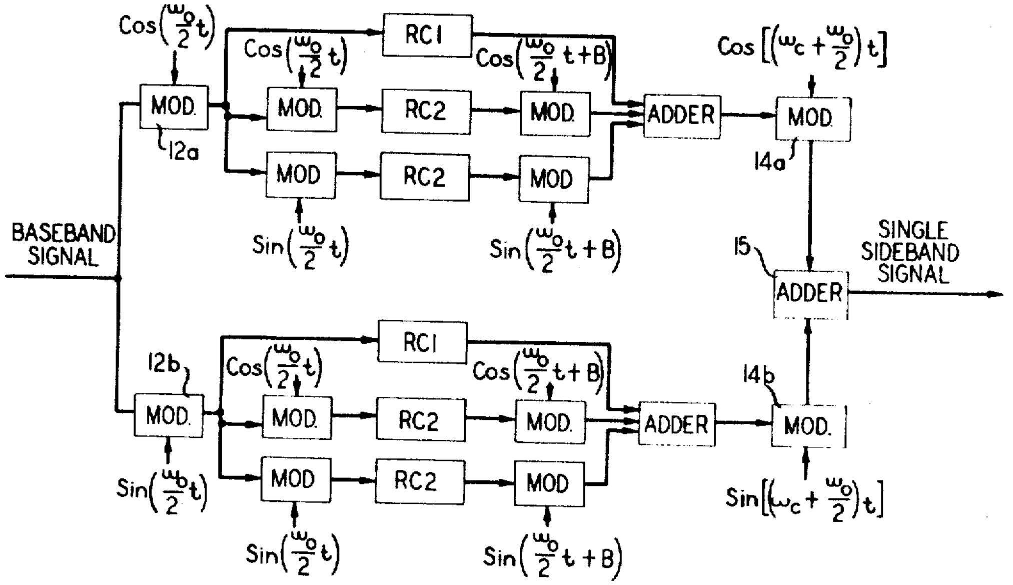
FIGS. 8 and 9 are block diagrams of single-sideband modulators, in accordance with this invention.

Alternatively, if so desired, the modulators 12a, 12b and FIG. 8 may be replaced by an equivalent commutator device 16 as depicted in FIG. 10. Reversal of sign to maintain the proper phase relationship among the input samples, developed by sampler 10, is accomplished by inverters 36a and 36b. Utilizing the combinatorial principles of this invention, the single-sideband modulator of FIG. 10 may be simplified, as illustrated in FIG. 11. Since there are $2f_0$ samples per second (as required by the well-known Nyquist criterion), there are $f_0$ odd ordered samples per second and $f_0$ even ordered samples per second. Also, since the function sin ($2\pi f_0/2t$) passes through zero $f_0$ times per second as does the cosine function, the two sequences of zero points are interleaved exactly like the odd and even ordered samples of the input signal. Accordingly, a suitable choice of phase makes the sine function zero at all odd ordered sample times and the cosine function zero at all even ordered sample times. Thus, since two of the RC2 networks of FIG. 10 receive no input at all, i.e., the appropriate multiplication factors are zero at all pertinent sample times, they may be deleted from the circuit. The appropriate multiplication factors for the remaining two RC2 networks, used to realize the filter function $A_2(t)$, are alternatively +1 and −1 at the pertinent sample times and thus the sign reversal apparatus 36 of FIG. 10 need not be utilized. On the other hand, differential amplifiers 23a, 23b are used to maintain the proper phase relationship among the signals conveyed to the RC1 networks. Thus, in FIG. 11, commutator 16a completes one cycle for every four samples of the input signal, while commutator 16b completes one cycle for every two samples of the input signal. FIGS. 9 and 11 are, evidently, alternative embodiments of the same single-sideband modulator.

More generally, in the single-sideband modulators of this invention utilizing commutators in lieu of conventional modulators, since each multiplication factor at the input end of an N-

Path filter is applied to either the even ordered or odd ordered samples of the input signal, the value of the factor is of no significance except at pertinent sampling instants. If each multiplication factor is periodic with a frequency of repetition equal to an integer, $n$, multiple of $1/4n$ th of the sampling frequency $2f_o$, the appropriate values of the multiplication factors repeat cyclically at least every $4n$ samples. Thus, in general, a single-sideband modulator may be realized by the circuit illustrated in FIG. 12 wherein resistance network 25 furnishes transmission paths from each tap of commutator 16 to the appropriate RC network with transmission voltage ratios proportional to the multiplication factors evaluated at those instants at which the commutator tap is selected. The design of resistance networks to accomplish the above purpose is well known to those skilled in the art. A simple voltage divider is a typical example of such a network.

Reference to equation (8) will reveal that the phase angle $\beta$ is constant in all terms of $A_2(t)$. By easing this constraint of uniformity, it is possible to synthesize a filter with relatively few poles, having a flat passband and narrow transition interval, which substantially eliminates frequencies above the transition interval, thereby enhancing the performance of the single-sideband modulator of this invention. Accordingly, as a generalization of equation (8), $A_2(t)$ may take the following form $$A_2(t)=\sum_{\lambda=1}^{N_2}K_\lambda e^{-a_\lambda t}\cos\left(\frac{W_o}{2}t+\beta\lambda\right) \tag{11}$$

where $\beta$ may be different for each term.

Figure 13:
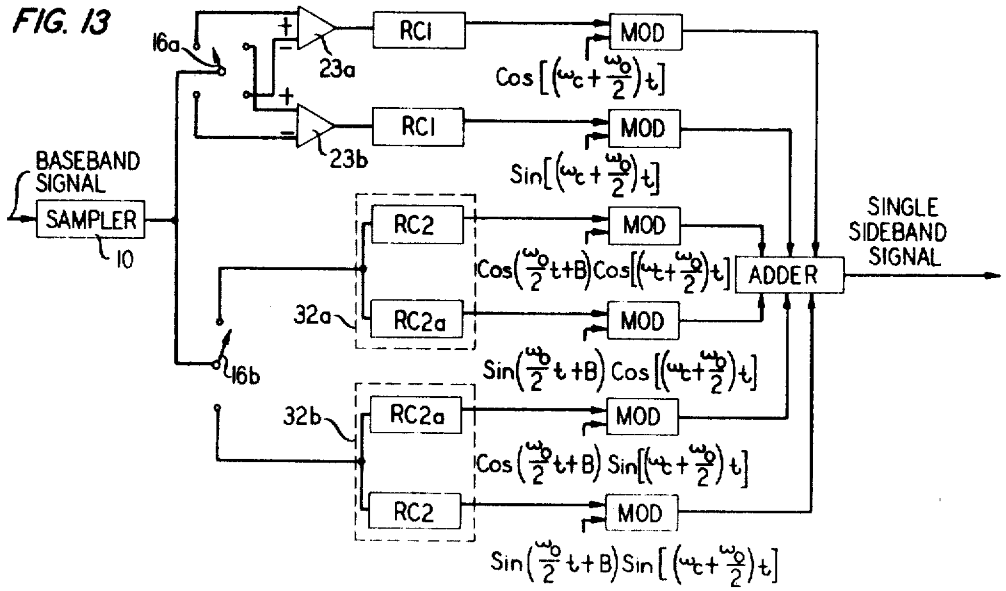
FIG. 13 illustrates a generalization of the single-sideband modulator depicted in FIG. 11.

FIG. 13 illustrates a single-sideband modulator which embodies the transmission characteristics defined in equation (8) as modified by equation (11). Comparison with FIG. 11 will indicate that the only modification required of the apparatus therein illustrated is the addition of two circuit branches, each comprising an additional network RC2*a* and modulator. Of course, the same principles are applicable to the single-sideband modulator of FIG. 9. With few exceptions, the two RC networks, RC2 and RC2*a*, have the same poles. Accordingly, each pair of RC circuits may be replaced by a more general 3-Port network, that is, a network with one input and two outputs, as indicated by blocks 32*a* and 32*b* in FIG. 13. The design of equivalent 3-Port networks is well known to those skilled in the art and will not be discussed herein to avoid unduly burdening this application with details too well known to bear repeating.

Figure 14A:
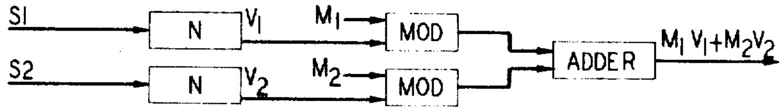
FIGS. 14a and 14b are block diagrams illustrating the principles of linear transformation.
Figure 14B:
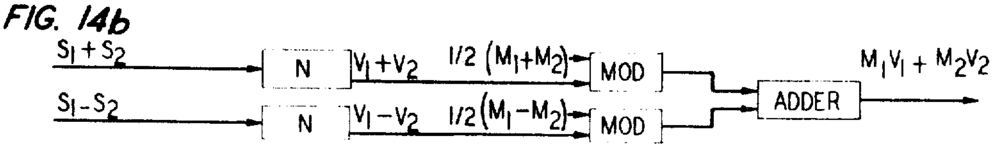
Figure 15:
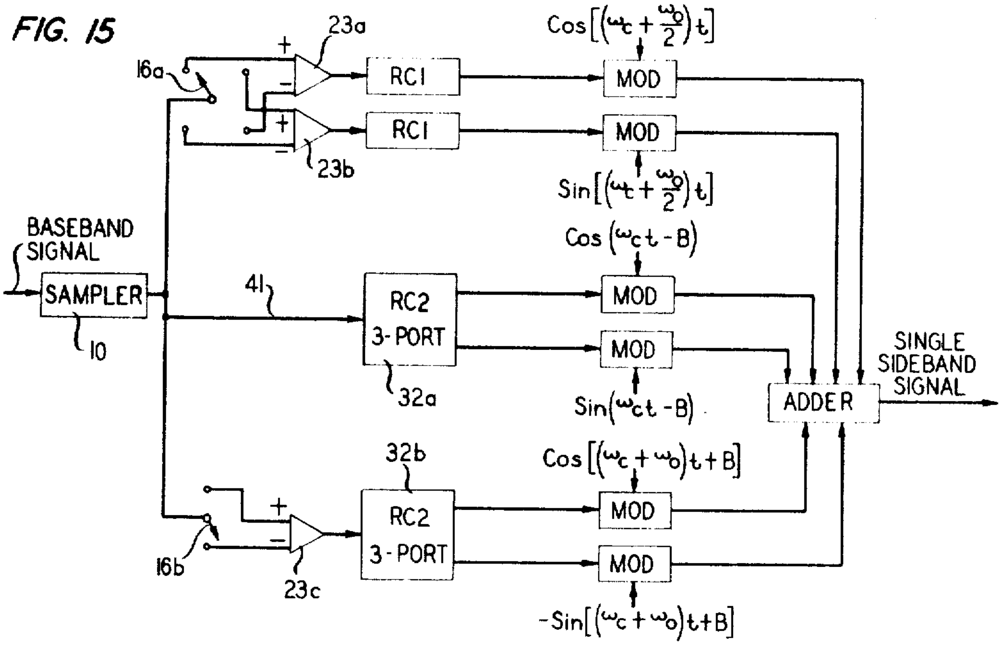
FIG. 15 illustrates a linear transformation of the single-sideband modulator depicted in FIG. 13.

FIGS. 14*a* and 14*b* illustrate two equivalent circuits, each comprising the parallel connection of two branches containing a network, N, and a modulator, wherein one is derived from the other by means of a linear transformation of the input and output, a technique well known to those versed in the art of network analysis. Applying the same technique to the single-sideband modulator of FIG. 13, the modulator circuit depicted in FIG. 15 is obtained. Line 41 conveys to network 32*a* the sum of two signals, i.e., the odd and even ordered samples of the input signal, $S_1+S_2$, while differential amplifier 23*c* develops a signal proportional to the difference of the two signals, corresponding to $S_1-S_2$. The modulating signals, applied to the modulators connected to the output of networks 32*a* and 32*b*, correspond to the sum and difference of the original modulating signals.

Pursuing this technique further, a plurality of RC networks such as found in the single-sideband modulator of this invention, may be treated as a single network having a corresponding plurality of poles and a linear transformation may be applied to all inputs and outputs. Linear transformations of the type described offer a design flexibility which permits reduction of sensitivity to component variations and adjustment of configurations for convenient and economical realization by specific thin film or solid state circuit fabrication techniques.

Figure 9:
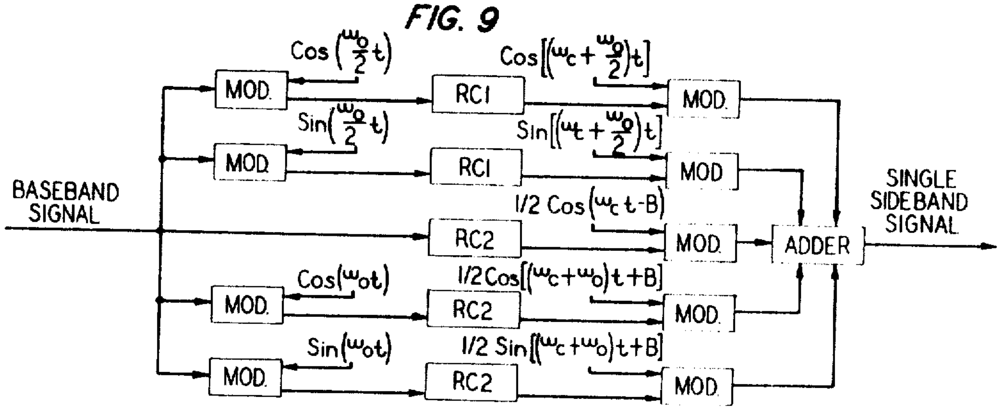

In accordance with the principles of this invention, the constraint requiring that the RC networks depicted in the single-sideband modulators described herein be characterized only by real poles may be removed. Thus, in equation (9) the impulse response function may have the more general form of $$Y_1=\sum_{\theta=1}^{N_1}\frac{K_\theta}{iw+a_\theta+iw_\theta}$$

$$Y_2=\sum_{\lambda=1}^{N_2}\frac{K_\lambda}{iw+a_\lambda+iw_\lambda} \tag{12}$$

in which $w_\theta$ is not necessarily zero, $w_\lambda$ is not necessarily equal to $w_0/2$, and $K_\theta$ and $K_\lambda$ can be complex. Networks having complex poles may be realized by means of active *RC* circuits, i.e., circuits comprising active devices such as amplifiers, in a manner well known to those skilled in the art. As discussed above, filters having desired responses generally require complex poles with large ratios of imaginary to real parts. Such networks tend to be relatively complicated and sensitive to component variations. In accordance with the principles of this invention, the ratio of imaginary to real parts of the poles may be substantially reduced, thereby obviating a perplexing problem of the prior art. If the poles of the network described by $Y_2$ include $$s_\theta=-a_\theta\pm iw_\theta, \tag{13}$$

then the corresponding networks, replacing, for example, the RC networks in FIGS. 9, 10, or 13, have a corresponding pair of complex poles $$s_\theta=-a_\theta\pm i\left(w_\theta-\frac{w_o}{2}\right). \tag{14}$$

It is to noted that the imaginary part of the defined pairs of poles consist of the difference of two angular frequencies. Thus, the previously described circuits of this invention are a special case of equation (14) where $w=w_o/2$. An example may help to illustrate the substantial reduction in the ratio of imaginary to real parts obtained by this invention. A filter suitable for use in a single-sideband modulator, may be characterized as follows:

| Poles | Complex form | Ratio imaginary part to real part |
|---|---|---|
| $s_1, s_2$ | $-(.42\pm i.26)\frac{w_0}{2}$ | 0.62 |
| $s_3, s_4$ | $-(.28\pm i.66)\frac{w_0}{2}$ | 2.4 |
| $s_5, s_6$ | $-(.13\pm i.85)\frac{w_0}{2}$ | 6.5 |
| $s_7, s_8$ | $-(.36\pm i.92)\frac{w_0}{2}$ | 25.6 |

In the single-sideband modulator of this invention, since the division of poles between $Y_1$ and $Y_2$ is arbitrary, poles $s_1$ and $s_2$ may be assigned to $Y_1$ and $s_3$ through $s_8$ assigned to $Y_2$. Then the poles which must be realized by active RC networks used in any of the single-sideband modulators of this invention are as follows:

| Poles | Complex form | Ratio imaginary part to real part |
|---|---|---|
| $\hat{s}_1, \hat{s}_2$ | $-(.42\pm i.26)\frac{w_0}{2}$ | 0.62 |
| $\hat{s}_3, \hat{s}_4$ | $-(.28\pm i.34)\frac{w_0}{2}$ | 1.2 |
| $\hat{s}_5, \hat{s}_6$ | $-(.13\pm i.15)\frac{w_0}{2}$ | 1.2 |
| $\hat{s}_7, \hat{s}_8$ | $-(.36\pm i.08)\frac{w_0}{2}$ | 2.2 |

It is to be noted that the maximum ratio is now less than 2.3, that is, a reduction in the ratio of imaginary to real part of more than 10:1. Various allocations of the poles of functions $Y_1$ and $Y_2$ result in substantial savings in commutator switching points, simplification of output multiplication factors and a significant reduction in sensitivity to component variations.

It is to be understood that the embodiments shown and described herein are illustrative of the principles of this invention only, and that modifications of this invention may be implemented by those skilled in the art without departing from the scope and spirit of the invention. For example, the principles of this invention may be applied to a conventional modulator utilizing a band-pass filter instead of a low-pass filter; an N-Path filter may be substituted for the band-pass filter and the various product modulators may be combined in the manner described above.

What I claim is:

1. A modulator comprising:

a plurality of parallel branch circuits each comprising first means for developing the modulation product of an applied signal and a first modulating signal, said first modulating signal being a function of the maximum frequency component of said applied signal and the imaginary part of the poles of a predetermined filter transfer function, a filter network responsive to said modulation product characterized by a transfer function realizable with noninductive elements having poles corresponding to the real part of the poles of said predetermined filter transfer function, and second means responsive to the output signals of said filter network for developing a modulation product of said output signals and a second modulating signal, said second modulating signal being a function of a predetermined carrier frequency, said maximum frequency component and said imaginary part of the poles of said predetermined filter transfer function, and means for combining the signals developed at the output of said branch circuits in order to develop a single-sideband modulated version of said applied signal.

2. A single-sideband modulator comprising:

a plurality of parallel branch circuits each comprising first means for developing the modulation product of an applied signal and a first modulating function, said first modulating function itself being the product of two sinusoidal waveforms having arguments, respectively, which are functions of the maximum frequency component of said applied signal and the imaginary part of the poles of a predetermined filter transfer function, a noninductive filter network responsive to said modulation product, and second means responsive to the output signals of said filter network for developing a product of said output signals and a second modulation function, said second modulation function itself being the product of two sinusoidal waveforms having arguments, respectively, which are functions of a predetermined carrier frequency, said maximum frequency component, and said imaginary part of the poles of said predetermined filter transfer function, and means for combining the signals developed at the output of said branch circuits.

3. The method of generating a single-sideband signal comprising the steps of:

separately and simultaneously modulating an applied signal with a plurality of predetermined signal waveforms, each signal waveform corresponding to a function of the arithmetic combination of the maximum frequency component of said applied signal and the imaginary part of the poles of a predetermined filter transfer function, separately processing each of said modulated signals by passage through a noninductive filter network having poles corresponding to the real part of the poles of said predetermined filter transfer function, separately modulating each of said processed signals with a plurality of signal waveforms, each signal waveform corresponding to a function of the arithmetic combination of said maximum frequency component of said applied signal, a predetermined carrier frequency, and said imaginary part of the poles of said predetermined filter transfer function, and arithmetically combining said modulated processed signals to eliminate undesired signal spectral components.

4. A single-sideband modulator comprising:

a source of band limited signals, a plurality of circuit paths responsive to said signals, at least one of said circuit paths further comprising the serial connection of first means, a noninductive filter network, and second means, said first means forming a product of said band limited signals and an applied waveform representing the product of two predetermined waveforms which are, respectively, functions of the maximum frequency component of said band limited signals and the imaginary part of the poles of a predetermined filter transfer function, said noninductive filter network having poles corresponding to the real part of the poles of said predetermined filter transfer function, and said second means forming a product of the output signals of said noninductive filter and an applied waveform representing the product of two predetermined waveforms which are, respectively, functions of said maximum frequency component and a predetermined carrier frequency, and said imaginary part of the poles of said predetermined filter transfer function, and means for arithmetically combining the signals developed by each of said circuit paths.

5. A single-sideband modulator comprising:

a source of sampled band limited signals, means for selectively commutating said signals at a frequency related to the maximum frequency component of said band limited signals, a plurality of circuit paths responsive to said commutated signals, at least one of said circuit paths further comprising the serial connection of a noninductive filter, having poles corresponding to the real part of the poles of a predetermined filter transfer function, and modulating means, said modulating means developing a signal proportional to the product of signals developed by said noninductive filter and a predetermined waveform functionally related to said maximum frequency component, the imaginary part of the poles of said predetermined filter transfer function, and a predetermined carrier frequency, and means for arithmetically combining the signals of each of said circuit paths.

6. Single-sideband modulation apparatus comprising:

a source of input signals, means for sampling said input signals, means responsive to said sampled signals for sequentially applying said sampled signals to a plurality of circuit paths, multipath network means, exhibiting a plurality of signal path transfer functions, connected to said circuit paths for selectively altering the magnitude of each of said applied signals by predetermined multiplication factors, a plurality of noninductive filter network means having poles corresponding to the real part of the poles of a predetermined filter transfer function, each filter network responsive to one of said magnitude altered signals for changing the frequency characteristics of said signals, a plurality of modulation means, each respectively connected to one of said filter network means, for multiplying filtered signals with a predetermined waveform functionally related to the maximum frequency component of said input signals, the imaginary part of the poles of said predetermined filter transfer function, and a predetermined carrier frequency, and means responsive to the signals developed by said plurality of modulation means for arithmetically combining said signals.

7. The method of generating a single-sideband signal comprising the steps of:

separately and simultaneously multiplying an applied signal with a plurality of predetermined signal waveforms, each signal waveform functionally related to the maximum frequency component of said applied signal and the imaginary part of the poles of a predetermined filter transfer function, separately processing each of said multiplied signals by passage through a noninductive filter network having poles corresponding to the real part of the poles of said predetermined filter transfer function, separately multiplying each of said processed signals with a plurality of signal waveforms, each signal waveform functionally related to the maximum frequency component of said applied signal, a predetermined carrier frequency, and said imaginary part of the poles of said predetermined filter transfer function, and arithmetically combining said multiplied processed signals.